US009490980B2

(12) United States Patent
Deshpande

(10) Patent No.: US 9,490,980 B2
(45) Date of Patent: Nov. 8, 2016

(54) AUTHENTICATION AND SECURED INFORMATION EXCHANGE SYSTEM, AND METHOD THEREFOR

(71) Applicant: Nachiket Girish Deshpande, Mumbai (IN)

(72) Inventor: Nachiket Girish Deshpande, Mumbai (IN)

( * ) Notice: Subject to any disclaimer, the term of this patent is extended or adjusted under 35 U.S.C. 154(b) by 0 days.

(21) Appl. No.: 14/381,156

(22) PCT Filed: Feb. 27, 2013

(86) PCT No.: PCT/IN2013/000113
§ 371 (c)(1),
(2) Date: Aug. 26, 2014

(87) PCT Pub. No.: WO2013/128470
PCT Pub. Date: Sep. 6, 2013

(65) Prior Publication Data

US 2015/0082025 A1 Mar. 19, 2015

(30) Foreign Application Priority Data

Feb. 27, 2012 (IN) .......................... 517/MUM/2012

(51) Int. Cl.

| | |
|---|---|
| ***H04L 29/06*** | (2006.01) |
| ***H04L 9/32*** | (2006.01) |
| ***H04L 9/08*** | (2006.01) |
| ***H04W 12/06*** | (2009.01) |

(52) U.S. Cl.
CPC ........... *H04L 9/3213* (2013.01); *H04L 9/0847* (2013.01); *H04L 63/062* (2013.01); *H04L 63/08* (2013.01); *H04W 12/06* (2013.01); *H04L 63/0807* (2013.01); *H04L 2209/80* (2013.01)

(58) Field of Classification Search
USPC .......................................................... 713/155
See application file for complete search history.

(56) References Cited

U.S. PATENT DOCUMENTS 7,370,202 B2 5/2008 Appenzeller et al.
9,124,650 B2 * 9/2015 Maharajh
2005/0010801 A1 * 1/2005 Spies .................... H04L 9/3073 726/5
2006/0095771 A1 * 5/2006 Appenzeller ........... H04L 9/006 713/171
2009/0046852 A1 * 2/2009 Vanstone .............. H04L 9/3263 380/30
2009/0323972 A1 * 12/2009 Kohno ................ G06F 21/6245 380/284

FOREIGN PATENT DOCUMENTS

WO 2005001629 A2 1/2005
WO 2009009869 A1 1/2009

OTHER PUBLICATIONS

International Search Report from Application No. PCT/IN2013/000113; filed Feb. 27, 2013.

* cited by examiner

*Primary Examiner* — Jason Lee
(74) *Attorney, Agent, or Firm* — Baker & Hostetler LLP

(57) ABSTRACT

Identity based encryption (IBE). An IBE server assigns a private and public key pair to a client device based on a unique identification of the client device. To establish an encrypted session with the client device a server device requests the client device's public key from the IBE server. Authentication of the client and the server by the IBE server is based on credentials or a token. Assigned keys are securely stored in an embedded trusted platform provided in the client device.

12 Claims, 12 Drawing Sheets

100
30
10
Management

AUTHENTICATION AND SECURED INFORMATION EXCHANGE SYSTEM, AND METHOD THEREFOR

CROSS-REFERENCE TO RELATED APPLICATIONS

This application is a National Stage of International Patent Application No. PCT/IN2013/000113, filed Feb. 27, 2013, which claims priority to foreign Indian Patent Application No. 517/MUM/2012, filed Feb. 27, 2012, the contents of which are incorporated herein by reference in their entirety.

FIELD OF THE INVENTION

The present invention relates to an information exchange system and method therefor and, more particularly, the present invention relates to the authentication and secured information exchange system for client communication devices, for example, mobile devices.

BACKGROUND AND PRIOR ART

The present products for secured information exchange system available in the market use basic user level authentication and authorization system such as login and password coupled with standard SSL/TSL based encryption, where a private key is installed on a server and public key is distributed on the client devices. In certain products for secured information exchange system, the device identification is also included as authentication components. Specifically, the current system of authorization and authentication are based on the client-initiated communication.

SUMMARY OF THE INVENTION

The products of the prior art leave gaps in the information exchange security.

In case of compromise of the login credentials of the user, all the sensitive information is compromised.

In case if server initiated communication, the security and encryption methodology is not clearly defined.

In case of the server private key getting compromised, all the clients devices are vulnerable to the attack.

In case of theft of device, unauthorized user may get access to the sensitive data.

In case of a spurious client software/application being used by entity with malicious intents, it may have easier access to the critical information.

Lack of unified authorization and encrypting system to handle push as well as pull communication.

The sensitive information is directly exchanged during access/transferred.

An aspect in some embodiments of the present invention is to provide an authentication, and secured information exchange system, and method for communication devices, for example, the mobile devices which encompass unique aspects of information exchange.

Another aspect in some embodiments of the present invention is to provide an authentication and, secured information exchange system, and method therefor, wherein a user is granted access to critical information on verification and confirmation of combination of any of the authentication parameters unique to every user and every device.

Yet another aspect in some embodiments of the present invention is to facilitate end-to-end encryption for client initiated communication, information sent from the client device to the secured server (Pull Communication) or the information sent from the server to the specific mobile device (Push Communication).

Yet another aspect in some embodiments of the present invention is to provide an authentication and secured information exchange system, and method therefor which facilitates authorization and encryption for server initiated (Push Communication) where the server initiates the communication with the communication device, for example, the mobile device.

Still another aspect in some embodiments of the present invention is to provide an authentication and secured information exchange system, and method therefor which acts as a secured gateway between the communication device and the data server, providing reliable information exchange platform for payment, financial, health, corporate and any critical data exchange over the mobile devices.

Further aspect in some embodiments of the present invention is to identify, verify and authorize the access to critical information based on the various identification parameters of user, secured mobile device, communication channel used, server communicating with user (FIG. 5) depending upon the nature of the information.

Furthermore aspect in some embodiments of the present invention to help and facilitate to generate digital certificate based on these parameters, wherein the digital certificate is generated using Public Key Infrastructure (PKI), and it can be signed by either internal or external Certifying Authority (CA).

One more aspect in some embodiments of the present invention is provide a digital certificate verified against practical parameters used in establishing the secured connection for exchange of critical information.

Furthermore aspect in some embodiments of the present invention is to create and facilitate hierarchy amongst the servers and mobile devices further connected and providing the control to allow levels of encryption and authorization.

Another aspect in some embodiments of the present invention is to provide an authentication and secured information exchange system, and method therefor which generates encryption methodology to undertake, secured communication with a particular entity based on its public/private identity.

One more aspect in some embodiments of the present invention is to have an identity based encryption for the user of the communication device, for example, the mobile device, wherein the public identity is used to allow unregistered user have a secured communication with over mobile device.

Further aspect in some embodiments of the present invention is to provide an authentication and secured information exchange system, and method therefor which generate context based encryption, wherein certain specific data can be added with various levels of encryptions, access controls as well as security levels.

Accordingly, in one aspect, the present invention provides a system for authentication and secured information exchange, the system comprising:

- a plurality of client devices capable of sending and receiving data, each client device of the plurality of client devices having unique identification, each client device comprising,
  - a secured interaction suit as a common platform for applications/browsers on the client device, or independent for specific set of the applications/browsers and any other software's or functional elements used to communicate within the system the secured interaction suit having
a private key for decrypting the data received, and a public key;
a plurality of servers communicating with the plurality of client devices, each server having unique identification, each server of the plurality of server comprising,
a plurality of public keys corresponding to the private keys of the plurality of client devices, and
a private key for the corresponding public key of the client devices for decrypting the data received; and
a device identification and management module capable of being interacting with the plurality of client devices and the plurality of servers, the device identification and management module performs any one of identity-based encryption of the client device to generate the public keys, a digital token based authentication of any one client device and the server, and combination of the identity-based encryption and the digital token based authentication.

In another aspect, the present invention provides a method of authentication of a client device, a server, and secured information exchange therebetween, the method comprising:
establishing identity of the client device;
establishing identity of the server;
generating and providing a private key and a public key for the server in the client device where the server is registered, for data exchange between the client device and the server;
providing device identification and authorization module (DIAM) which interacts with client device and the server;
initiating two way encryption of the information exchanged between the client device and the server;
enabling secured information exchange for server initiated communication
initiating a secured communication using identity base unified encryption system;
initiating token based authorization of the client device and the server; and
initiating context based encryption of the client device and the server.
facilitating verification of the digital certificates internally or externally through the Public Key Infrastructure (PKI) system

DETAIL DESCRIPTION OF THE INVENTION

Figure 1:
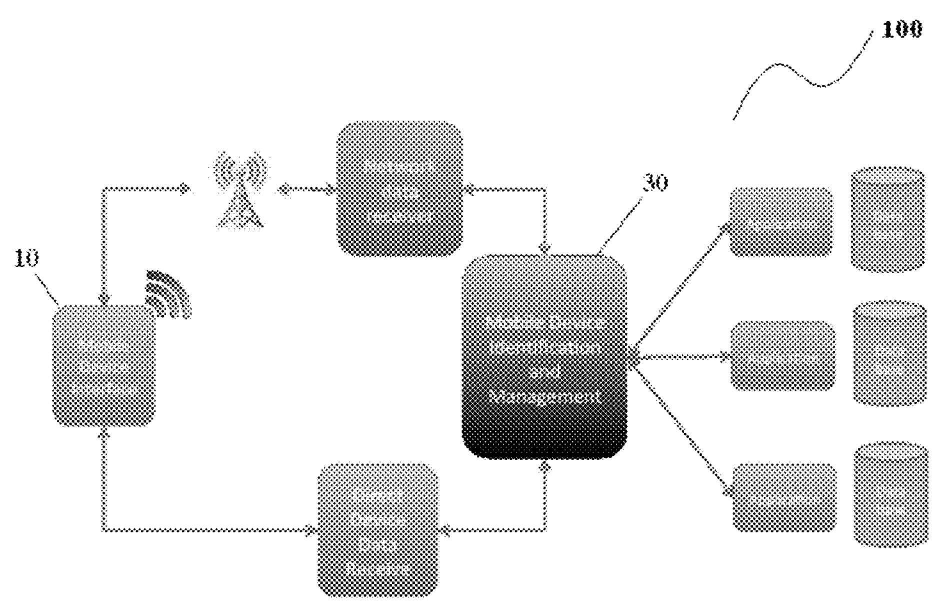
FIG. 1 shows a schematic diagram of a system for authentication and secured information exchange, in accordance with the present invention.

The foregoing objects of the present invention are accomplished and the problems and shortcomings associated with the prior art, techniques and approaches are overcome by the present invention as described below in the preferred embodiments.

The present invention provides an authentication, and secured information exchange system and method for communication devices, for example, mobile devices. The system and method ensures superior identification, authentication, authorization and secured gateway access for communication of sensitive data. The mobile device authentication, management and security system and method manages the device and secured server certificates, its installation, management, validation and deletion.

Referring to FIG. 1-10, there are shown various aspects of the system (100) for authentication and secured information exchange. The system (100) includes a plurality of client devices (for example $C_1$, $C_2$, $C_3$, . . . , $C_n$) (10), a plurality of servers (for example, $S_A$, $S_B$, $S_C$, . . . , $S_{A1}$, $S_{Zn}$) (20) and a device identification and management (DIAM) module (30) capable of being interacting with the plurality of client devices (10) and the plurality of servers (20) at direct level or in hierarchical order or in a branched structure.

The plurality of client devices (10) are capable of sending and receiving data from the server (20). For purpose of explanation, the term mobile communication device is used for the client devices (10) interchangeably throughout the description. However, it may be evident to those skilled in the art that other communication devices capable of computing and processing the information other than mobile communication devices can be used.

Each mobile device (10) have unique identification. Specifically, each mobile device (10) hardware includes a unique code or unique hardware identity for identification present or assigned by the system thereof. Further, each server (20) also have a unique identity present or assigned by the system.

The mobile device (10) further have identity of communication channel it is using to communicate with the system. Specifically, the communication channel have the identity of the communication mode/channel/type identity. The communication channel has an unique identity of the mobile device trying to communicate with the server over the specific communication channel/mode/type.

For each mobile device user (10), the unique identity is established, which the user has to verify by means of one or combination of authentication methods, such as unique login identification, password, unique graphical pattern identity, biometric identity such as finger prints/facial recognition/retina scan, or any other.

The mobile device (10) communicates the data with the server (20) using connectivity means, such as WAP, GPRS, 3G, 4G, Blue Tooth, Near Field Communication (NFC), Wi-fi, Wi-Max or any other communication/connectivity methodology using socket based communication, HTTP, Datagram protocols or any other suitable communication protocol. In an embodiment, the communication is wireless data-exchange or via wired data exchange, where the mobile device (10) directly communicates with the server (20).

Specifically, the system (100) identifies the mode of communication and its identity for connection with registered secured servers. This is done by two methods as shown in FIG. 1.

Secured Mobile Device Communicating Via Mobile Network

When the data is communicated between a secured mobile device (10) and secured server (20), the data is passed through the internet, public networks, through Mobile Service Provider (MSP) and/or many other of servers over unsecured environment through wired or wireless communication.

Secured Mobile Device Communicating Directly

When the data is communicated to and fro directly between secured system servers (20) and secured mobile device (10), through wired or wireless communication.

The information communicated between the servers (20) and the mobile device (10) is used by applications, software's, web browsers, or any other software programs on the mobile device (10). Each authorized element of these software's has unique identity, captured and monitored as per the system (100) requirement.

Figure 5:
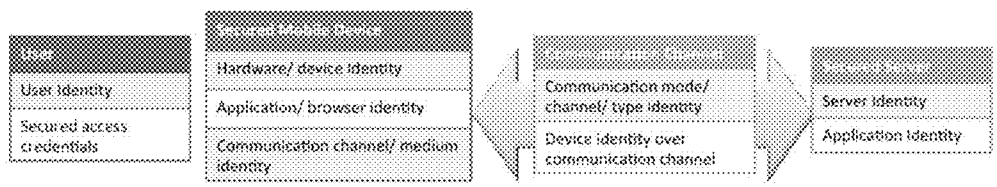
FIG. 5 shows an authentication components of the system for authentication and secured information exchange.
Figure 6:
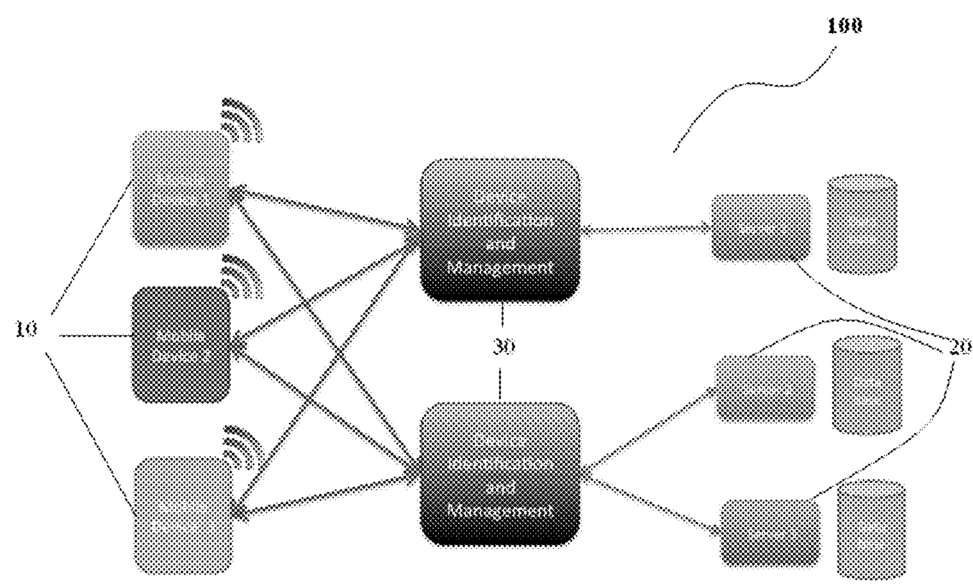
FIG. 6 shows a secured information exchange environment with multiple communication devices and servers.

Specifically, the secured information communicated between the mobile device (10) and the server (20) have the identification and authentication parameters as shown in FIG. 5. As per the requirement and criticality of the information communicated along for due authentication of the request, the authentication components and parameters are set, adjusted, modified and managed from the DIAM module as shown in FIG. 1.

Similarly, the information received also include the unique identity of the server (20) from which the request is originating and its required identification parameters. Specifically, the server (20) has relevant identity of the origin of the information such as application, location, user, and mode of communication channel used and the like.

Figure 2:
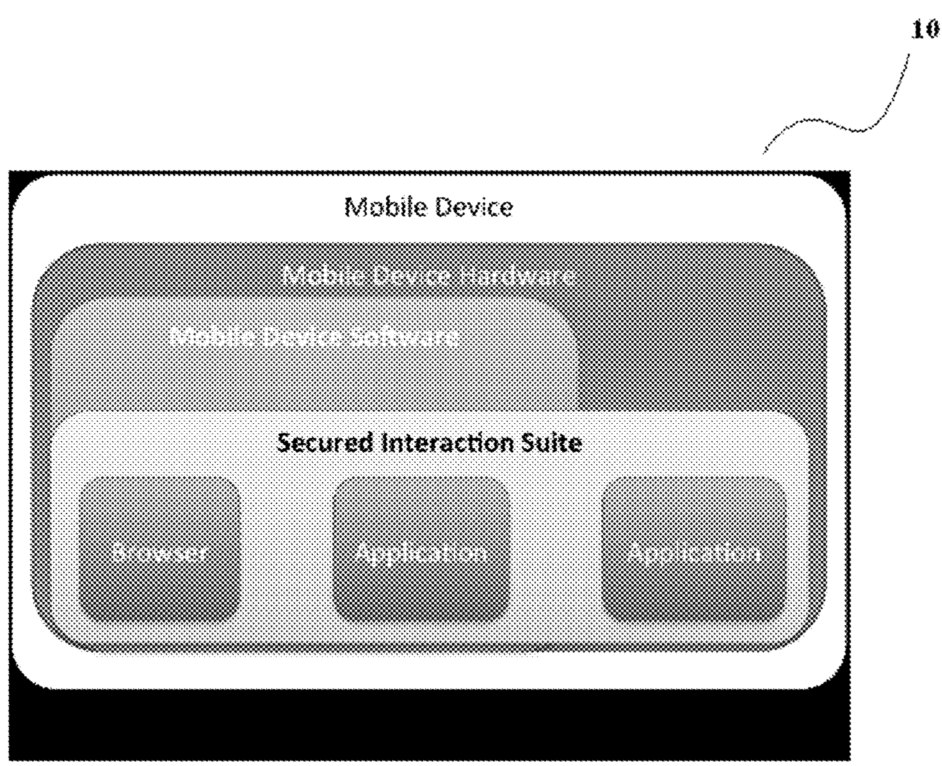
FIG. 2 shows a secured communication device, for example, a mobile device architecture for authentication and secured information exchange, in accordance with the present invention.

Each mobile device (10) includes a secured interaction suit (12) as shown in FIG. 2, which serves as a common platform for all the applications/browsers and any other software's or functional elements; or independent for specific set of the applications/browsers and any other software's or functional elements used to communicate within the system (100). The secured interaction suit (12) is a secured program installed on the existing hardware of the mobile device (10) or embedded in the hardware of the mobile device (10) or part of the hardware attached externally to the device in form of memory chip, dongle device, or any other similar device capable of performing desired operations.

Figure 3:
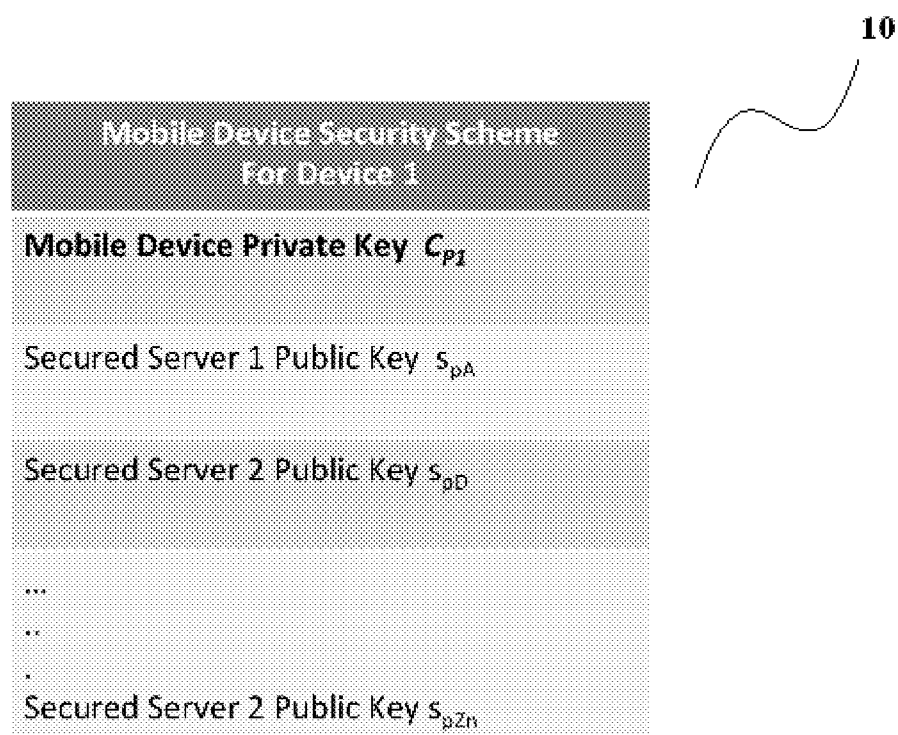
FIG. 3 shows a communication device, for example, a mobile device security scheme for authentication and secured information exchange, in accordance with the present invention.

As shown in FIG. 3, the mobile device (10) comprises two types of encryption keys securely stored in the secured interaction suit (12). The secured interaction suit (12) has a unique private key of the mobile TSL/SSL certificate to decrypt the data sent by the server (20). Further, the DIAM module (30) of the system (100) and/or the servers in the system has a public keys corresponding to the private key installed on the mobile device (10), where the mobile device (10) is registered.

The public key may be distributed to further in the servers/clients, which are registered in the system to communicate with the mobile device. This public key may be bonded to the digital certificate comprising details of the user, device, mode/channel of communication and so for as mentioned. The certificate and public key together is signed by a Certifying Authority internal or External to the system under consideration as per Public Key Infrastructure (PKI) standards.

Further, the mobile device (10) includes a public keys stored for each of the registered server (20)[$c_{p1}$, $c_{p4}$, . . . $c_{pn}$] and a unique private key securely stored for decrypting the data received for the same corresponding public key is stored on the respective registered server [$C_{P1}$](20).

Figure 4:
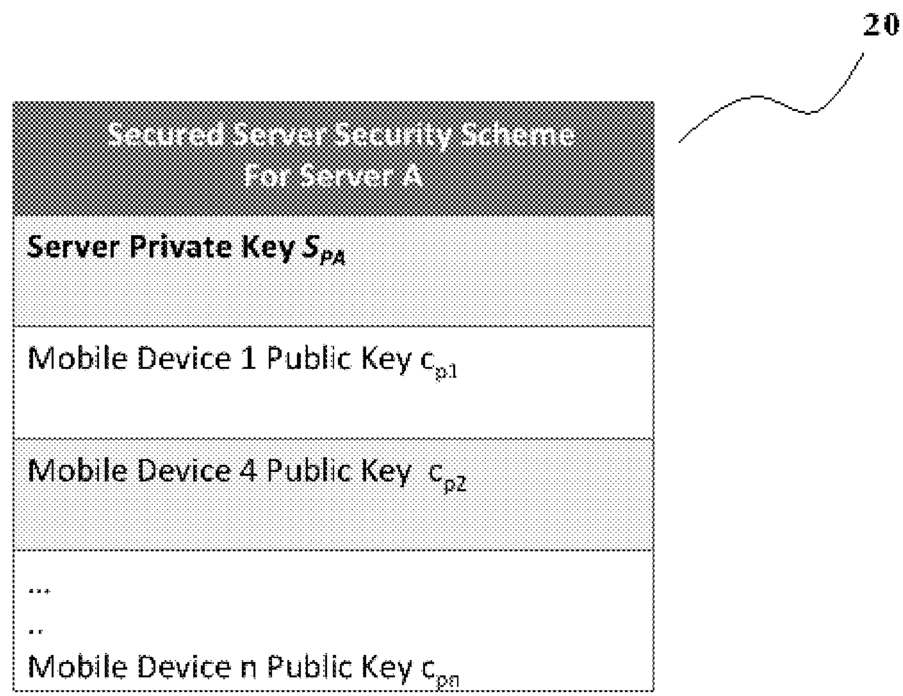
FIG. 4 shows a secured server security scheme for authentication and secured information exchange, in accordance with the present invention.

Similarly, the server (20) of the system (100) represent exact replica of the scheme as shown in FIG. 4, where the public keys for all the authorized mobile devices (10) [$c_{p1}$, $c_{p2}$, . . . $c_{pn}$] are stored and the unique private key of the each server (2) $S_{PA}$ is stored securely.

The combinations of public and private keys used for the secured communication in the system (100) have validity defined for a specific period or a session or a particular program or a user, set of users managed and governed by the DIAM module (30).

In case of server initiated communication (Push communication) the server initiates the handshake process to establish a secured connection. The process allows the selection of the cipher suits, encryption methods, version, type of protocol to be selected, server and client certificate validation, the session parameters exchange and validation. The public key with the server would be verified with the digital certificate corresponding to the mobile device as applicable. In this process the various parameters of mentioned on the digital certificate are verified against the actual communication process, On successful validation of the process the secured connection is established. Similarly the digital certificate for the server also is generated as exact replica of the system and can used for validation and authentication.

The system works with multiple mobile devices (10) and server (20) working in tandem, communicating and exchanging data. Each sever (20) registered in the system (100) have the DIAM (30) module or DIAM module combined for a set of the servers. Specifically, each device identification and management module can interact with one or more secured servers.

Device identification and management module (30) is capable of being interacting with the plurality of client devices (10) and the plurality of servers (10). The DIAM (30) performs any one of identity-based encryption of the client device to generate the public keys, a digital token based authentication of any one client device and the server, and combination of the identity-based encryption and the digital token based authentication. The DIAM also performs the Context based encryption in tandem with identity based encryption and token based authorization as per the requirement.

The system (100) provides secured information access and communication by mobile device (100) initiated standard client server communication and also for the server initiated communication (Push communication.)

Figure 7:
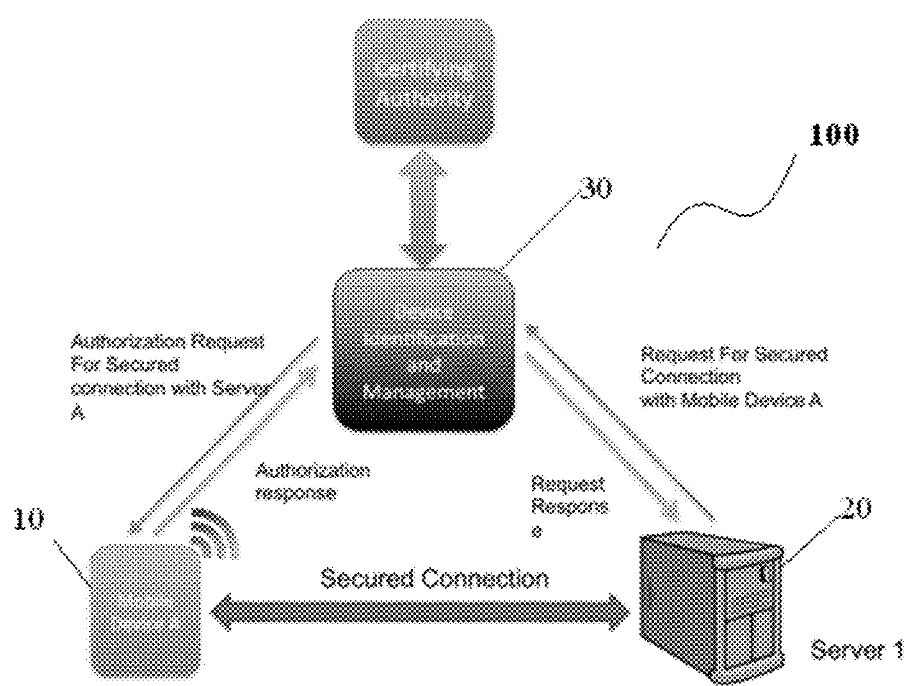
FIGS. 7 and 8 shows an identity-based encryption for authentication and secured information exchange, in accordance with the present invention.

The system (100) further provides a unified encryption i.e. an identity-based encryption to create the public key for the mobile device under consideration (10), as shown in FIG. 7. In such case, a public identity such as target user identity (eg. mobile number or server application), unique hardware identification, and/or unique network identification is used to create a public key for secured communication between the mobile device (10) and the server (20).

The server (20), which seeks to communicate with the mobile device (10), sends a request to the DIAM module

(30) with target mobile device/user identity. The DIAM module (30) first verifies the credentials of the server (20). The DIAM module (30) further generates a public key) corresponding to the private key of the specific mobile device (10) and sends the same to requesting in the server (20) over secured channel already established. Using this public key, the server/application/external user (20) tries to establish a secured connection with the target mobile device (10). The public key-private key pair is can be replaced in the given system depending upon time, number of sessions used or any other criteria set. In case of a mobile device trying to communicate with specific server, this scheme is replicated where public key corresponding to the public identity of the application server is created and is sent to mobile device to establish a secured connection.

The system (100) further provides token-based authentication for server initiated communication as shown in 9. In case of access to the critical information, the DIAM module (30) generates a unique token in digital form. When a user/system needs authorization for access of information of specific mobile device or consent for methoding the specific information, exchange of specific information, the digital token is generated.

The digital token provides identity of issuer, identity of the authorizer, and the task identity. The task is any one of a particular information exchange, information transaction or authorization, method initiation, and termination. In further methoding of this token, no identity of the authorizer or request sender is exchanged in any form.

From the DIAM module (30) of the secured system (100), the digital token is sent for the authorization to the specific client, for example, the mobile device (10). The digital token is sent via server-initiated communication i.e. the push communication or the presented to the mobile device (10) when the mobile device (10) communicates with the server (20) (Push communication)

The mobile device (10) identifies the digital token and grants authorization by submitting required credentials, or rejects the authorization request.

On receipt of this authorization request, the DIAM module (30) verifies credentials of the mobile device/user or the other relevant parameters required or set (10). If the token is valid as well as the details submitted by the authorizer are valid, the DIAM module (30) grants access to the secured information for required methoding, exchange or access. In an embodiment, the token issuer defines the validity of the token. The validity is defined on the basis of time, location, attempts of access to the information, or other relevant parameters. The validity access parameters, authorization levels can be monitored, controlled, altered through DIAM.

In another aspect, the present invention provides a method of authentication of a client device, a server, and secured information exchange therebetween. The client device described herein includes, for example, a mobile device and should not be considered as limiting the scope of the invention. The method includes establishing identity of the mobile device and the server. The identification of the mobile device and the server is done by method described for the system (100) and is not described herein again for the sake of brevity of the disclosure.

Further, the method includes providing a private key and a public key for the server in the mobile device where the server is registered. The private key provided in the mobile device provide for decrypting data sent by the server.

Moreover, the method includes providing device identification and authorization module (DIAM) which interacts with client device and the server.

Also, the method includes initiating a secured communication between client-server using identity based unified encryption systems and providing token based authorization.

Figure 8:
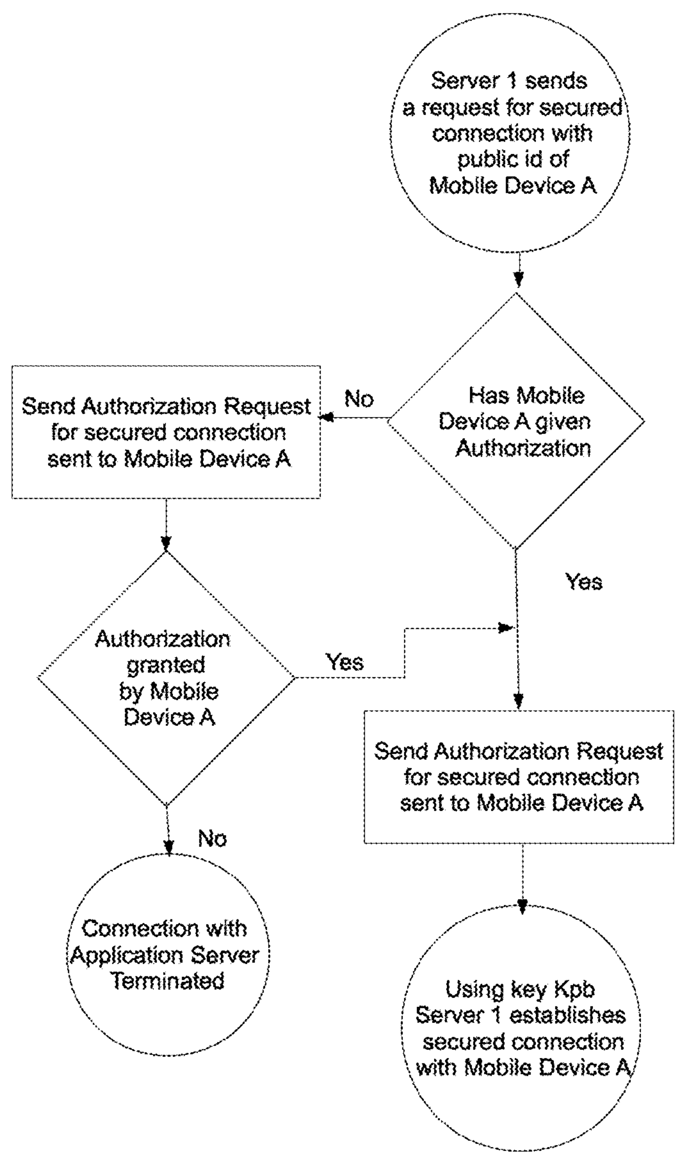
Figure 9:
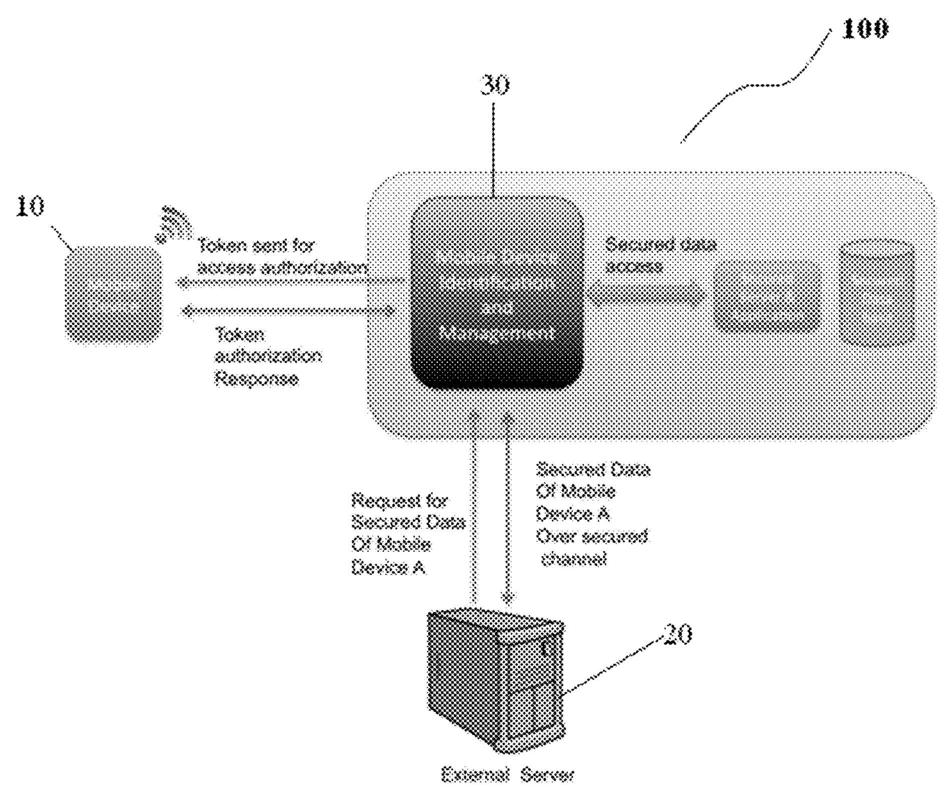
FIGS. 9 and 10 shows flowcharts of token-based authentication for authentication and secured information exchange, in accordance with the present invention.
Figure 10:
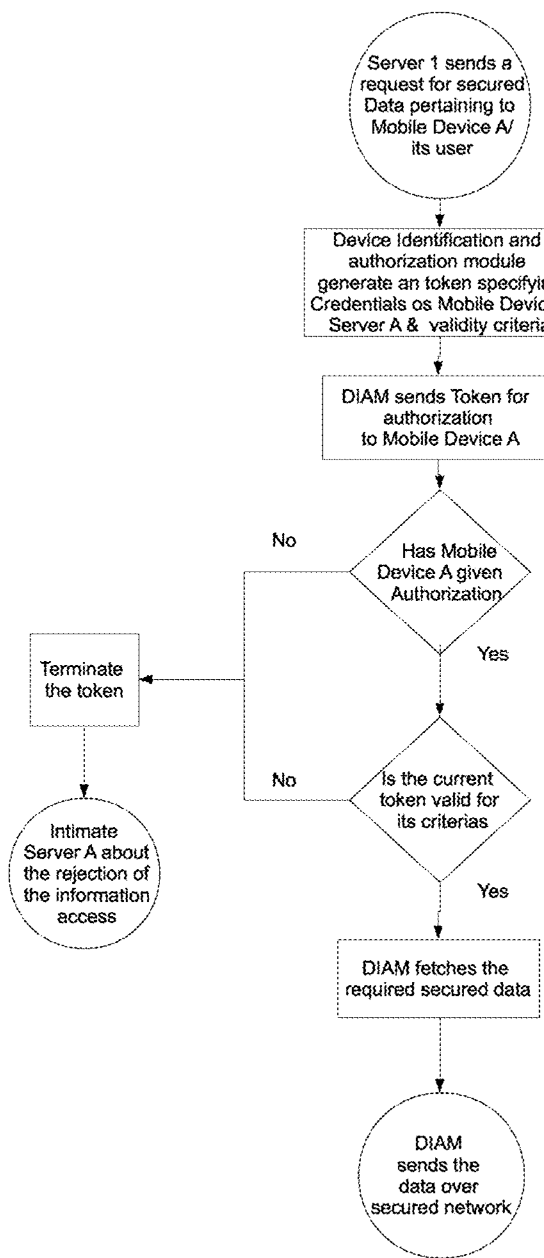
Figure 11:
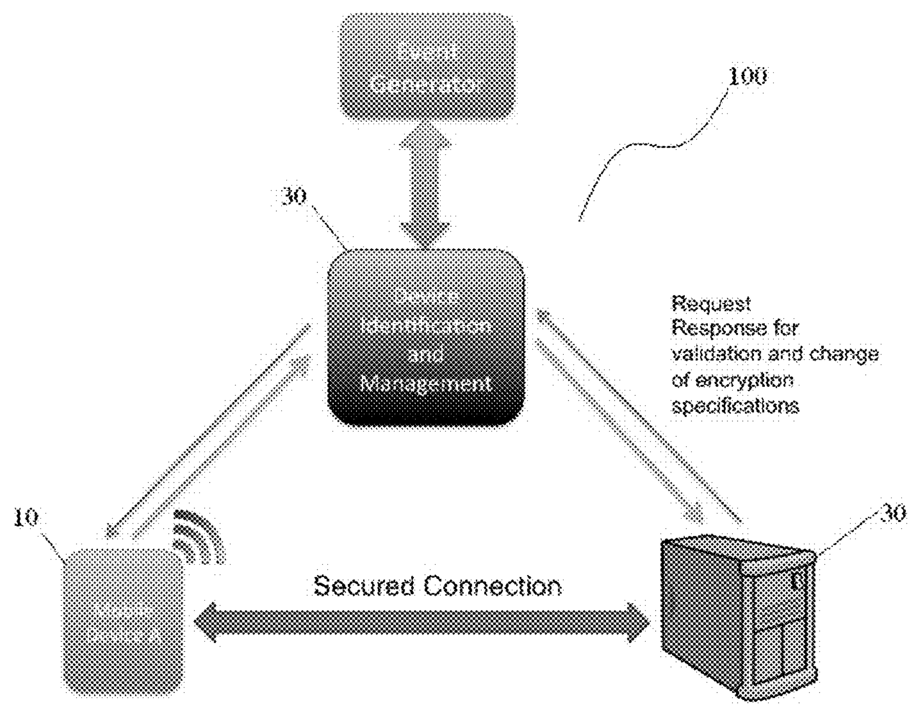
FIG. 11 shows representation of the components for context based encryption and 12 shows flowcharts of context based encryption, in accordance with the present invention.

The identity base unified encryption process includes sending a request by the server/application/user to the DIAM (30) with a target mobile device/user identity, which may be available in public domain. The DIAM module (30) first verifies credentials of the server/application/user. Thereafter, the DIAM module (30) generates a public key corresponding to a private key of the client device and sends the generated public key to the requesting server, the generated public key may be verified against the digital certificate, thereby allowing to establishing a secured connection with the mobile device. The flowchart of the identity base unified encryption method is shown in FIG. 8.

The similar scheme is used to initiate communication based on the severs public identity where server is assigned private key and public key based on its public identity is distributed to the mobile device.

Further, the token based authorization comprises generating a digital token in response to a request for authorization sent by any one of the mobile device and the server. The token is then sent for authorization one of the mobile device and the server. The mobile device or the server identifies the token and grants authorization by submitting required credentials, or rejects the authorization request. Finally, credentials of the client device or server are verified on receipt of the authorization request. In an embodiment, the token issuer defines validity of the token. In another embodiment, the token is a digital token.

The system (100) uses a context based encryption process. The context based encryption process includes generating a request by the server/application/user for authorization, authentication and/or encryption which triggers the authorization/authentication/encryption process/es specific for the data exchange underway between a target mobile device/user. It initiates the encryption, changes the level of encryption, changes mode/type of encryption, changes the cipher suits or so.

Figure 12:
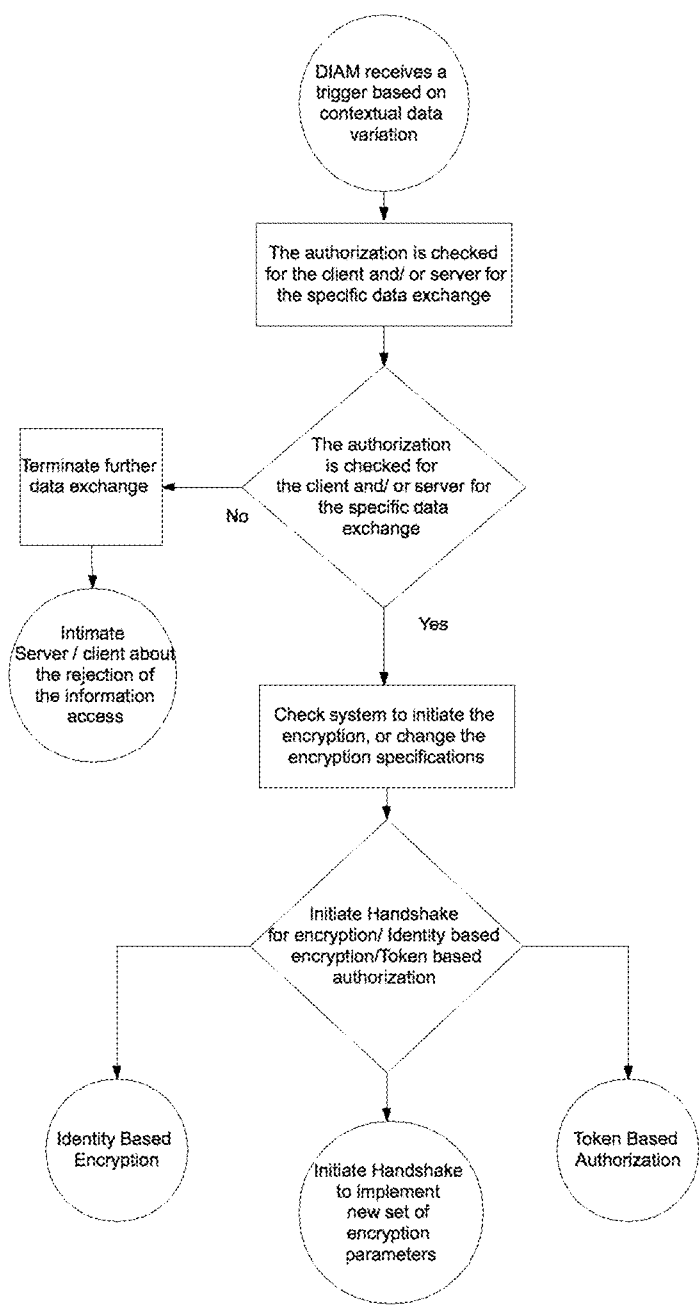

The context may be defined as 'any information that can be used to characterize the situation of an entity. An entity is a person, place, or object that is considered relevant to the interaction between a user, client an application, including the user and applications. Also the set of circumstances or facts that surround a particular event, situation, etc. involving the exchange of information between the user, client, device, system and application. The flowcharts of the context based encryption is shown in FIG. 12 and FIG. 12 shows the broad overview of the communication schema.

There are pre stored parameters such as the amount of data exchanged, specific flow of data/information exchange or the dynamic parameters such as time, location of the user which are internal or external to the system and trigger the authorization and subsequently encryption process. The system may also initiate interaction with another server, application or system based on the trigger it receives. On receiving the specific input for user, client, device identity would be verified and encryption level may be defined or triggered on this validation. The DIAM module first verifies credentials of the server/application/use. Thereafter, the DIAM module checks the current status of information exchange and further prepares system to initiate communication on the new defined parameters. It may trigger token based authorization or identity based encryption in this process.

APPLICATION EXAMPLES

In this example 'the authentication, secured information exchange system for communication devices for example, the mobile devices' is used to carry out the financial transactions, or medical information exchange.

The mobile devices deployed have the access to payment gateways, banking and non-banking institutions. The mobile device users can receive invoices, make payments, receive payment authorization requests and receive acknowledgements.

The secured server system (100) and method is installed at the financial institutes, payment gateways, banking and non-banking institutions. The authorized mobile users allowed to register with the respective entity have the authentication data stored for each request received. Each mobile device have the public keys saved for the respective institutes/organization for which the user has subscribed. Similarly, each authorized mobile devices have public key is stored at the respective financial institute's server.

Further, for each transaction request, the secured server verifies the authorization criteria's set by the respective institute/organization using communication components such as user identity, device identity, application/software credentials and registers channel/network of communication along with the geographical location at the time of request.

On authentication of these details, a secured channel of two way encryption is established, over which the request is communicated via secured server to respective payment methoding system. Again, a feedback of the methoding request is communicated to the secured sever via payment methoding system. Secured system (100) identifies the registered mobile user/device, secured double-layered communication is established and the feedback message is communicated to expected receiver.

This communication may take place directly between the secured mobile device and the secured server using WAP, GPRS, 3G, 4G, Blue Tooth, Near Field Communication (NFC), Wi-fi, Wi-Max using HTTP, Datagram protocols or any other suitable communication protocol, while doing wireless data-exchange or via connecting the device to the network with wire, where the mobile device directly communicates with the secured server.

The system and the method of the present invention have advantage of having all the unique aspects of information exchange over mobile devices. Further, in the system and the method, a user is granted access to the critical information on verification and confirmation of combination of any of the authentication parameters. Moreover, the system and the method acts as a secured gateway between the authorized user, mobile device and the data server, providing reliable information exchange platform for payment, financial, health, corporate, legal and any critical data exchange over the mobile devices.

It should be understood that the present invention is not to be limited by the exact details of the illustrated embodiment. However, it is to be taken as the preferred example of the invention and that various changes may be resorted to by a person skilled in the art without departing from the spirit of the invention. Also, the terminologies used herein are for the purpose of description and should not be regarded as limiting.

I claim:

1. A system for authentication and secured information exchange, the system comprising:

a plurality of client devices configured to send and receive data, each client device of the plurality of client devices having unique identification, each client device comprising, a secured interaction suit as a common platform for information exchange on the client device, the secured interaction suit having a private key for decrypting the data received, and a plurality of public keys;

a plurality of servers communicating with the plurality of client devices, each server having a unique identification, each server of the plurality of servers comprising, a plurality of public keys corresponding to the private keys of the plurality of client devices, and a private key for the corresponding public key of the client devices for decrypting the data received; and a device identification and management module configured to interact with the plurality of client devices and the plurality of servers, the device identification and management module performs an authorization of devices on various authorization parameters, sets hierarchical encryption levels facilitating end-to-end encryption, facilitates an identity-based encryption of the client device to generate the plurality of public keys, and a digital token based authentication of any one client device and the server that comprises generating a digital token in response to a request for authorization sent by any one of the plurality of client devices and the plurality of server, with a combination of the identity-based encryption and the digital token based authentication, to facilitate secured communication for the request of the client device initiated or server initiated communication, wherein the device identification and management module comprises a single device identification and management module (DIAM).

2. The system as claimed in claim 1, wherein the device identification and management module comprises multiple device identification modules distributed over the servers.

3. The system as claimed in claim 1, wherein secured interaction suit is a program securely installed/embedded on hardware of the client device or part of the hardware attached externally to the client device in form of a memory chip, dongle device, or any other similar device capable of performing desired operations.

4. The system as claimed in claim 1, wherein the plurality of client devices communicates with the plurality of servers by any one of wired and wireless means.

5. A method of authentication of a client device, a server, and secured information exchange there between, the method comprising:

establishing identity of the client device;

establishing identity of the server;

generating and providing a private key and a public key for the server to the client device where the server is registered, for data exchange between the client device and the server;

generating and providing a private key and a public key to the server where the client device is registered for communication with the server, for data exchange between the client device and the server;

providing a device identification and authorization module (DIAM) which interacts with client devices and the server;

initiating two way encryption of information exchanged between the client device and the server;

enabling a secured information exchange for server initiated communication;

initiating a secured communication using an identity base unified encryption system;

initiating a digital token based authorization of the client device and the server that comprises generating a digital token in response to a request for authorization sent by any one of the client device and the server; and initiating context based encryption of the client device and the server.

6. The method as claimed in claim 5, enabling the secured information exchange for server initiated communication comprises initiating by the server, a communication with the client device;

providing own identity and credentials by the server;

carrying out negotiations for the selection of a cipher suits, encryption methods, and version type of protocol to be selected;

validating the server and the client device certificates;

checking and accepting the session parameters;

establishing an encrypted/non encrypted/two way encrypted secured communication; and terminating a secured connection.

7. The method as claimed in claim 5, further comprising using a standard client-server communication using an identity base unified encryption device that comprises:

sending a request by the server to the device identification and authorization module (DIAM) with a target client device identity, wherein the device identification and authorization module (DIAM) first verifies credentials of the server;

generating a public key corresponding to a private key of the client device;

sending the public key to the requesting server, thereby establishing a secured connection with the client device; and changing, altering hash algorithms in the keys depending upon a session, time, and a level of hierarchy for other devices.

8. The method as claimed in claim 5, wherein initiating communication using the digital token based authorization comprises, the generating the digital token in response to the request for authorization sent by any one of the client device and the server;

sending the digital token for the authorization to the client device, wherein the client device identifies the digital token and grants authorization by submitting required credentials, or rejects the authorization request; and verifying credentials of the client device on receipt of the authorization request, wherein the digital token issuer defines at least a validity, access levels, and refresh intervals, of the digital token.

9. The method as claimed in claim 5, wherein the establishing identity of the client device comprises generation of digital certificate bonded to the public key corresponding to the private key of the client device, wherein the public key is distributed to the servers.

10. The method as claimed in claim 5, wherein the digital certificate comprises details of a user, device, and mode/channel of communication.

11. The method as claimed in claim 5, wherein the server initiates contextual encryption of the data by varying its level of authorization, and encryption.

12. The method as claimed in claim 5, wherein the context based encryption process comprises generating a request by the server/application/user for authorization, authentication and/or encryption which triggers the authorization/authentication/encryption process specific for the data exchange underway between a target client device and the user.

* * * * *